US011238608B2

(12) United States Patent
Noda et al.

(10) Patent No.: US 11,238,608 B2
(45) Date of Patent: Feb. 1, 2022

(54) LIFT-UP DETERMINING DEVICE AND LIFT-UP DETERMINING METHOD

(71) Applicant: Panasonic Intellectual Property Management Co., Ltd., Osaka (JP)

(72) Inventors: Akihiro Noda, Kanagawa (JP); Taro Imagawa, Osaka (JP); Hiroya Kusaka, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 33 days.

(21) Appl. No.: 16/810,909

(22) Filed: Mar. 6, 2020

(65) Prior Publication Data

US 2020/0202555 A1 Jun. 25, 2020

Related U.S. Application Data

(63) Continuation of application No. PCT/JP2018/019220, filed on May 18, 2018.

(30) Foreign Application Priority Data

Sep. 26, 2017 (JP) .............................. JP2017-185396

(51) Int. Cl.
*G06T 7/70* (2017.01)
*G06T 7/20* (2017.01)
*G06T 7/00* (2017.01)

(52) U.S. Cl.
CPC .................. *G06T 7/70* (2017.01); *G06T 7/20* (2013.01); *G06T 7/97* (2017.01); *G06T 2207/30248* (2013.01)

(58) Field of Classification Search
CPC ...................... G08G 1/015; G08G 1/04; G06T 2207/30248; G06T 7/20; G06T 7/70; G06T 7/73; G06T 7/97; G06K 2209/23; G06K 9/00335; G06K 9/00664; G06K 9/00785; G06K 9/72
See application file for complete search history.

(56) References Cited

U.S. PATENT DOCUMENTS

| | | | |
|---|---|---|---|
| 9,227,471 B2 * | 1/2016 | Kosugi | ............... B60C 23/0489 |
| 2014/0232566 A1 * | 8/2014 | Mimeault | ............. G01S 7/4802 340/935 |

(Continued)

FOREIGN PATENT DOCUMENTS

| | | |
|---|---|---|
| CN | 106575473 A | 4/2017 |
| DE | 102014012285 | 2/2016 |

(Continued)

OTHER PUBLICATIONS

The Extended European Search Report dated Oct. 6, 2020 for the related European Patent Application No. 18861591.8.

(Continued)

*Primary Examiner* — Bobbak Safaipour
(74) *Attorney, Agent, or Firm* — McDermott Will and Emery LLP

(57) ABSTRACT

A lift-up determining device includes a detector and a determination unit. The detector acquires a captured image including a tire on an axle of a vehicle and detects the tire from the captured image. The determination unit determines, based on a detection result by the detector, whether the axle is lifted up.

12 Claims, 13 Drawing Sheets

(56) References Cited

U.S. PATENT DOCUMENTS

| | | | |
|---|---|---|---|
| 2017/0277952 A1 | 9/2017 | Thommes et al. | |
| 2018/0249058 A1* | 8/2018 | Imagawa | G06T 7/70 |
| 2020/0074754 A1* | 3/2020 | Kaseda | G06T 3/4038 |
| 2020/0209049 A1* | 7/2020 | Noda | G06T 7/0008 |

FOREIGN PATENT DOCUMENTS

| | | |
|---|---|---|
| JP | 2003-111072 | 4/2003 |
| JP | 2016-162354 | 9/2016 |
| JP | 2017-220076 | 12/2017 |

OTHER PUBLICATIONS

Achler O et al: "Camera based vehicle detection, tracking, and wheel baseline estimation approach", Intelligent Transportation Systems, 2004. Proceedings. The 7th International IEEE Conference on Washington, DC, USA Oct. 3-6, 2004, Piscataway, NJ, USA, IEEE, Oct. 3, 2004 (Oct. 3, 2004), pp. 743-748, XP010772141.

Kenichi Hirose et al: "Accurate Estimation of Wheel Center Points for Estimate of Vehicle Baseline Length in a Circular Fisheye Image", Innovative Computing, Information and Control (ICICI C), 2009 Fourth International Conference on, IEEE, Piscataway, NJ, USA, Dec. 7, 2009 (Dec. 7, 2009), pp. 306-309, XP031627293.

Pan Bing et al: "Real-time, non-contact and targetless measurement of vertical deflection of bridges using off-axis digital image correlation", NDT & E International, vol. 79, Dec. 15, 2015 (Dec. 15, 2015), Dec. 15, 2015 (Dec. 15, 2015), pp. 73-80, XP029450582.

International Search Report of PCT application No. PCT/JP2018/019220 dated Aug. 14, 2018.

English Translation of Chinese Office Action dated Oct. 11, 2021 for the related Chinese Patent Application No. 201880061954.X.

* cited by examiner

LIFT-UP DETERMINING DEVICE AND LIFT-UP DETERMINING METHOD

TECHNICAL FIELD

The present disclosure relates to a lift-up determining device that determines whether one or more axles of a vehicle are lifted up.

BACKGROUND ART

Conventionally, some of vehicles having three or more axles are equipped with a lift axle mechanism. The lift axle mechanism brings up, in other words, lifts up at least one axle such that tires on the axle are not in contact with the ground.

Meanwhile, some toll roads have a toll system in which a toll is different depending on the number of axles whose tires are in contact with the ground.

Such toll roads are desired to be installed with a lift-up determining device that determines whether an axle of a vehicle running on the toll road is lifted up.

As a known example of conventional lift-up determining devices, an axle number detection device is described in, for example, PTL 1.

CITATION LIST

Patent Literature

PTL 1: Unexamined Japanese Patent Publication No. 2016-162354

SUMMARY

Regarding the above conventional axle number detection device, it is necessary to bury a road plate in a traveling road to detect when a traveling vehicle steps on the road. Therefore, it needs a certain cost to install, repair, or remove the above conventional axle number detection device.

The present disclosure is made in view of the above issues, and an object of the present disclosure is to provide a lift-up determining device with which the cost required for installation, repair, or removal of the lift-up determining device can be made lower than before, and to provide a lift-up determining method having such features.

A lift-up determining device according to an aspect of the present disclosure includes a detector and a determination unit. The detector acquires a captured image including a tire on an axle of a vehicle and detects the tire from the captured image. The determination unit determines whether the axle is lifted up, based on the detection result of the detector.

A lift-up determining method according to an aspect of the present disclosure acquires a captured image including a tire of an axle of a vehicle, detects the tire from the captured image, and determines whether the axle is lifted up.

With the above lift-up determining device and lift-up determining method according to the present disclosure, it is possible to make the cost required for installation, repair, or removal of the lift-up determining device lower than before.

DESCRIPTION OF EMBODIMENTS

Figure 1:
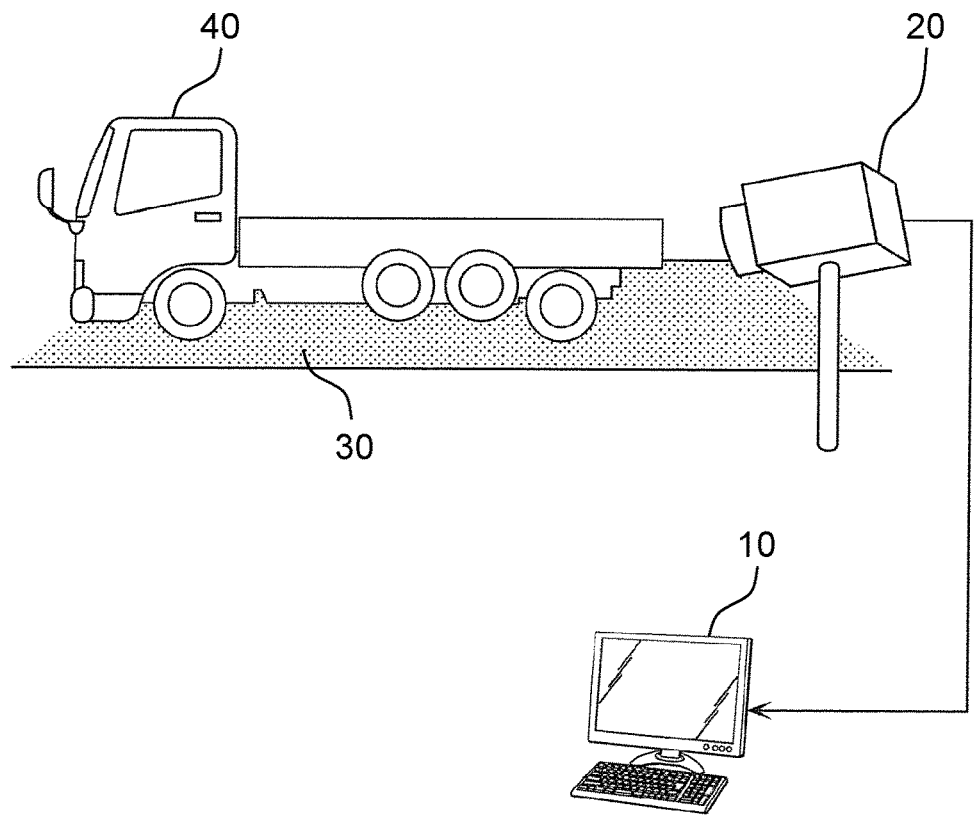
FIG. 1 is a schematic diagram showing an example of when it is determined whether lift-up is being performed.

A lift-up determining device according to an aspect of the present disclosure includes a detector and a determination unit. The detector acquires a captured image including a tire on an axle of a vehicle and detects the tire from the captured image. The determination unit determines whether the axle is lifted up, based on the detection result of the detector.

With this configuration, this lift-up determining device can determine in a non-contact manner whether at least one axle of a vehicle is lifted up.

Therefore, when this lift-up determining device is installed, it is not necessary to bury, in a traveling road or the like, a sensor and other components required to determine whether an axle is lifted up.

Therefore, with this lift-up determining device, it is possible to make a cost required for installation, repair, or removal of the lift-up determining device lower than before.

The above lift-up determining device may further include a position determination unit. If the tire is a middle tire located between a front-most front wheel tire on the vehicle and a rear-most rear wheel tire of the vehicle, the position determination unit may determine whether a lowest point of the middle tire is apart by greater than or equal to a predetermined value on an upper side of the vehicle from a baseline that extends, from a lowest point of the rear wheel tire, in a traveling direction of the vehicle. The determination unit may determine that the axle is lifted up when the position determination unit determines that the lowest point of the middle tire is apart by greater than or equal to the predetermined value on the upper side of the vehicle from the baseline.

The above lift-up determining device may further include a calculator. The calculator may calculate, from the captured image, a straight line connecting the lowest point of the front wheel tire and the lowest point of the rear wheel tire. The position determination unit may use the straight line calculated by the calculator as the baseline.

The above lift-up determining device may further include a rotation determination unit. The rotation determination unit may determine whether the tire detected by the detector is rotating, based on the captured image. If the rotation determination unit determines that the tire is not rotating, the determination unit may determine that the axle is lifted up.

In the above lift-up determining device, the rotation determination unit may determine whether the tire is rotating, based on a frequency component of a plurality of pixels included in an area of the tire.

In the above lift-up determining device, the rotation determination unit may determine whether the tire detected by the detector is rotating, based on a result of comparison between the frequency component and a frequency component of a plurality of pixels included in an area of the front-most front wheel tire of the vehicle.

In the above lift-up determining device, the rotation determination unit may determine whether the tire detected by the detector is rotating, based on a result of comparison between the frequency component and a frequency component of a plurality of pixels included in an area of the rear-most rear wheel tire of the vehicle.

In the above lift-up determining device, the detector may acquire another captured image including a tire and may detect the tire from the another captured image. The rotation determination unit may calculate a rotation amount of the tire based on the captured image and the another captured image and may determine whether the tire is rotating, based on the calculated rotation amount.

The above lift-up determining device may further include a deflection determination unit. The deflection determination unit may determine, based on the captured image, whether a local region of a road surface located directly under the lowest point of the tire detected by the detector is deflected by greater than or equal to a predetermined value. If the deflection determination unit determines that the local region is not deflected by greater than or equal to the predetermined value, the determination unit may determine that the axle is lifted up.

The above lift-up determining device may further include a position determination unit, a rotation determination unit, and a deflection determination unit. If the tire is a middle tire located between a front-most front wheel tire on the vehicle and a rear-most rear wheel tire of the vehicle, the position determination unit may determine whether a lowest point of the middle tire is apart by greater than or equal to a predetermined value on an upper side of the vehicle from a baseline that extends, from a lowest point of the rear wheel tire, in a traveling direction of the vehicle. The rotation determination unit may determine whether the tire detected by the detector is rotating, based on the captured image. The deflection determination unit may determine, based on the captured image, whether a local region of a road surface located directly under the lowest point of the tire detected by the detector is deflected by greater than or equal to a predetermined value. The determination unit may determine whether the axle is lifted up, based on the determination result of the position determination unit, the determination result of the rotation determination unit, and the determination result of the deflection determination unit.

A lift-up determining method according to an aspect of the present disclosure acquires a captured image including a tire on an axle of a vehicle, detects the tire from the captured image, and determines whether the axle is lifted up.

With this configuration, a lift-up determining device using the lift-up determining method can determine in a non-contact manner whether at least one axle of a vehicle is lifted up.

Therefore, when the lift-up determining device using this lift-up determining method is installed, it is not necessary to bury, in a traveling road or the like, a sensor and other components required to determine whether an axle is lifted up.

Therefore, with this lift-up determining method, it is possible to make a cost required for installation, repair, or removal of the lift-up determining device lower than before.

Note that these generic or specific aspects may be implemented by using a system, a method, an integrated circuit, a computer program, or a computer-readable recording medium such as a compact disc read only memory (CD-ROM), and may also be implemented by any combination of the system, the method, the integrated circuit, the computer program, and the recording medium.

Hereinafter, specific examples of a lift-up determining device according to an aspect of the present disclosure will be described. Note that each of the exemplary embodiments to be described below illustrates one preferred specific example of the present disclosure. Numerical values, shapes, materials, components, arrangement positions and connection configurations of the components, steps, processing order of the steps, and the like shown in the following exemplary embodiments are just an example, and are not intended to limit the present disclosure. The present disclosure is limited only by the scope of the claims. Therefore, among the components in the following exemplary embodiments, components not described in any of independent claims indicating the most generic concept of the present disclosure are not essential for achieving the object of the present disclosure but are described as components constituting a further preferable configuration.

First Exemplary Embodiment

In this exemplary embodiment, as an aspect of the present disclosure, there will be described a lift-up determining device that determines whether at least one axle of a vehicle is lifted up.

This lift-up determining device acquires from the outside a captured image of a vehicle including a tire. Then, the lift-up determining device determines whether at least one axle of the vehicle is lifted up, based on the acquired captured image.

Hereinafter, this lift-up determining device will be described in detail with reference to the drawings.

[1-1. Configuration]

FIG. 1 is a schematic diagram showing an example when lift-up determining device 10 according to the first exemplary embodiment determines whether at least one axle of vehicle 40 travelling on traveling road 30 is lifted up.

In this case, for example, lift-up determining device 10 is connected to image capturing device 20 that captures one or more captured images including one or more tires of vehicle 40 running on traveling road 30 To lift-up determining device 10, one or more captured images taken by image capturing device 20 are output from image capturing device 20.

Figure 2:
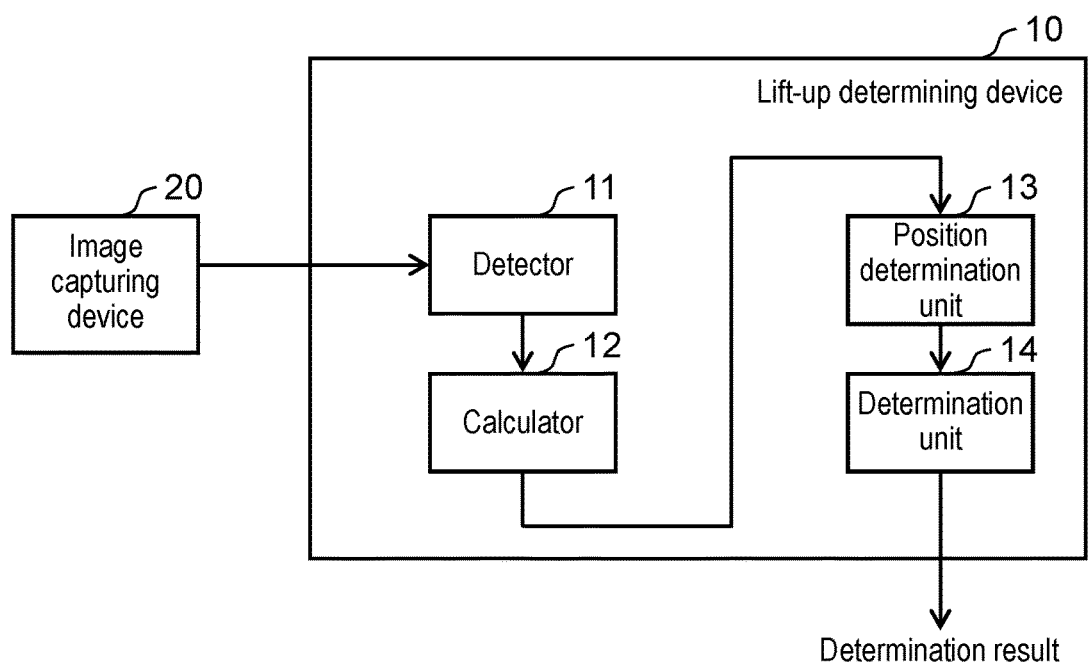
FIG. 2 is a block diagram showing a configuration of a lift-up determining device according to a first exemplary embodiment.

FIG. 2 is a block diagram showing a configuration of lift-up determining device 10.

As shown in FIG. 2, lift-up determining device 10 is configured to include detector 11, calculator 12, position determination unit 13, and determination unit 14.

Lift-up determining device 10 is implemented, for example, such that, in a computer (not shown) including a microprocessor (not shown) and a memory (not shown), the microprocessor executes a program stored in the memory.

Detector 11 acquires one or more captured images including a tire on an axle of one vehicle, from image capturing device 20. Then, detector 11 detects one or more tires from the acquired one or more captured images.

Detector 11 may detect a tire by, for example, previously machine learning on identification of tire. Further, detector 11 may detect a tire by, for example, using a template matching method.

Figure 3:
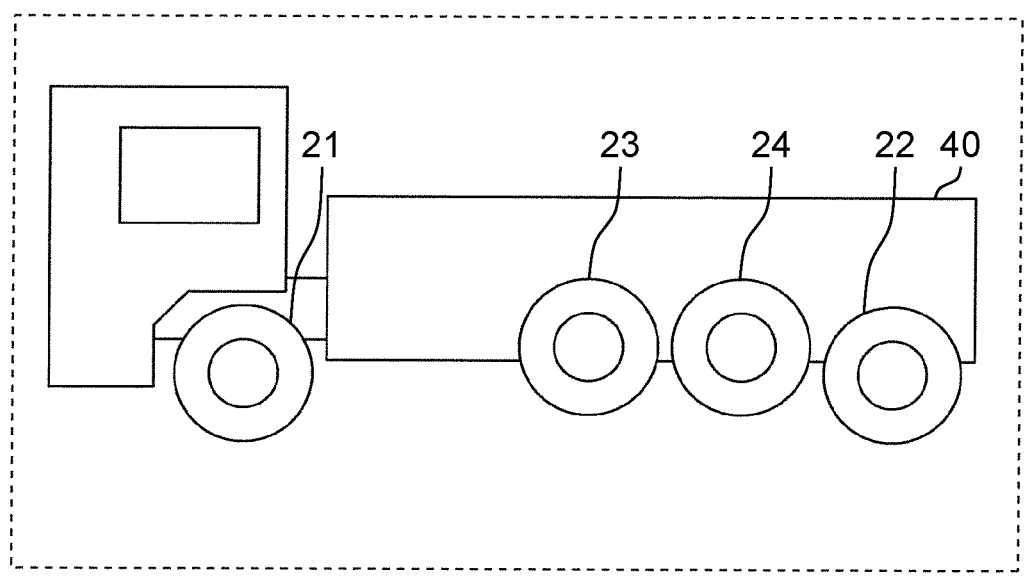
FIG. 3 is a schematic diagram showing an example of a captured image.
Figure 4A:
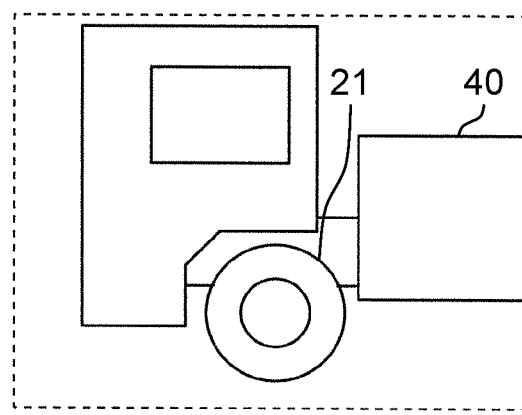
FIG. 4A is a schematic diagram showing an example of a captured image.
Figure 4B:
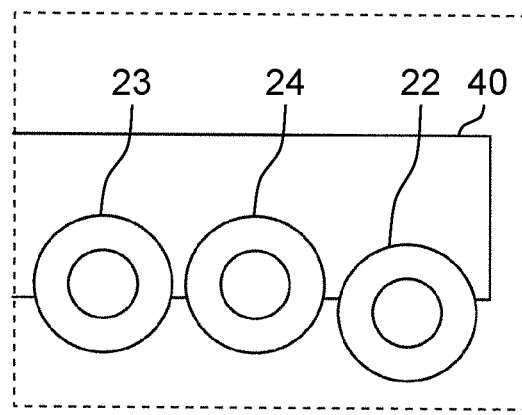
FIG. 4B is a schematic diagram showing an example of a captured image.

FIGS. 3, 4A, and 4B are schematic diagrams each showing an example of a captured image acquired by detector 11.

Detector 11 may acquire, from image capturing device 20, one captured image including front wheel tire 21 on a front-most axle of vehicle 40 and rear wheel tire 22 on a rear-most axle of vehicle 40, for example, as shown in FIG. 3.

Further, detector 11 may acquire, from image capturing device 20, a plurality of captured images each of which does not include front wheel tire 21 and rear wheel tire 22 of vehicle 40 at the same time, for example, as shown in FIGS. 4A and 4B.

Calculator 12 calculates a baseline that extends from a lowest point of rear wheel tire 22 in a traveling direction of vehicle 40, from the one or more captured images acquired by detector 11.

For example, in a case where a captured image acquired by detector 11 is one captured image including front wheel tire 21 and rear wheel tire 22 of vehicle 40 as shown in FIG. 3, calculator 12 may calculate, as the above baseline, a straight line connecting a lowest point of front wheel tire 21 and the lowest point of rear wheel tire 22 by using a detection result of detector 11.

Figure 5:
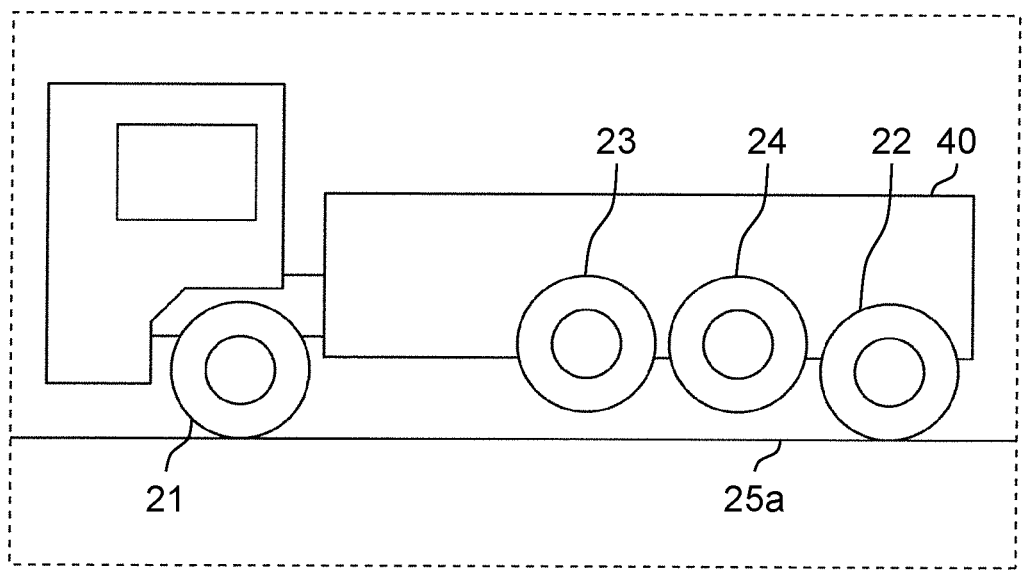
FIG. 5 is a schematic diagram showing a baseline.

FIG. 5 is a schematic diagram showing baseline 25a calculated by calculator 12 in the above example.

Alternatively, for example, in the case where the captured image acquired by detector 11 is a captured image including rear wheel tire 22 of vehicle 40 but not including front wheel tire 21 as shown in FIG. 4B, calculator 12 may calculate, as the above baseline, a straight line that extends from the lowest point of rear wheel tire 22 in the traveling direction of a driving lane on which vehicle 40 is running, by using a detection result of detector 11.

Figure 6:
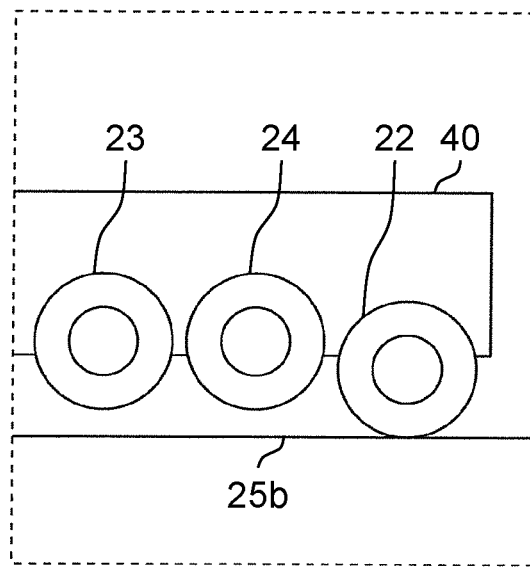
FIG. 6 is a schematic diagram showing a baseline.

FIG. 6 is a schematic diagram showing baseline 25b calculated by calculator 12 in the above example.

Alternatively, for example, in a case where the captured images acquired by detector 11 are a plurality of captured images (two images, in this case) each of which does not include front wheel tire 21 and rear wheel tire 22 of vehicle 40 at the same time as shown in FIGS. 4A and 4B, calculator 12 may compose these plurality of captured images to generate one composite image including front wheel tire 21 and rear wheel tire 22. Then, calculator 12 may calculate, as the above baseline, a straight line connecting the lowest point of front wheel tire 21 and the lowest point of rear wheel tire 22 by using the detection result of detector 11 from the composed composite image.

Position determination unit 13 determines whether the lowest point of a tire that is included in the one or more tires detected by detector 11 and is other than front wheel tire 21 or rear wheel tire 22 of vehicle 40 (in this case, the tire is, for example, tires 23 and 24 in FIGS. 3, 4B, 5, and 6, and hereinafter, referred to as "middle tire") is apart by greater than or equal to a predetermined value on the upper side of vehicle 40 from the baseline (in this case, the baseline is, for example, baseline 25a in FIG. 5 or baseline 25b in FIG. 6) calculated by the calculator.

Here, the above predetermined value may be any value as long as the value indicates that a tire on a middle axle is lifted up by a lift axle mechanism to such an extent that the tire is not in contact with the ground. The above predetermined value may be, for example, a predetermined pixel number of the captured image (for example, 100 pixels) or may be, for example, a predetermined distance converted to the real space (for example, 10 cm).

Determination unit 14 determines, based on the detection result of detector 11, whether at least one axle of vehicle 40 is lifted up.

More specifically, determination unit 14 positively performs the above determination, which is to be made by determination unit 14, if there is a tire that is positively determined by position determination unit 13.

In general, regarding a vehicle equipped with a lift axle mechanism, a middle tire on a middle axle other than the front-most axle and the rear-most axle of the vehicle is an object to be lifted up. Therefore, in the target vehicle, if the lowest point of the middle tire on the middle axle is apart by greater than or equal to the above predetermined value on the upper side of the vehicle from the baseline that extends from the lowest point of the rear wheel tire on the rear-most axle of the vehicle in the traveling direction of the vehicle, it means that the middle axle of the vehicle is lifted up.

Further, determination unit 14 negatively performs the above determination, which is to be made by determination unit 14, if there is no middle tire that is positively determined by position determination unit 13.

Then, determination unit 14 outputs the determination result to the outside.

An operation performed by lift-up determining device 10 having the above configuration will be described below with reference to the drawing.

[1-2. Operation]

Lift-up determining device 10 performs a first determination process as a characteristic operation of lift-up determining device 10.

The first determination process is a process that determines, if image capturing device 20 has output one or more captured images including one or more tires of one vehicle, whether at least one or more axles of the vehicle are lifted up.

Figure 7:
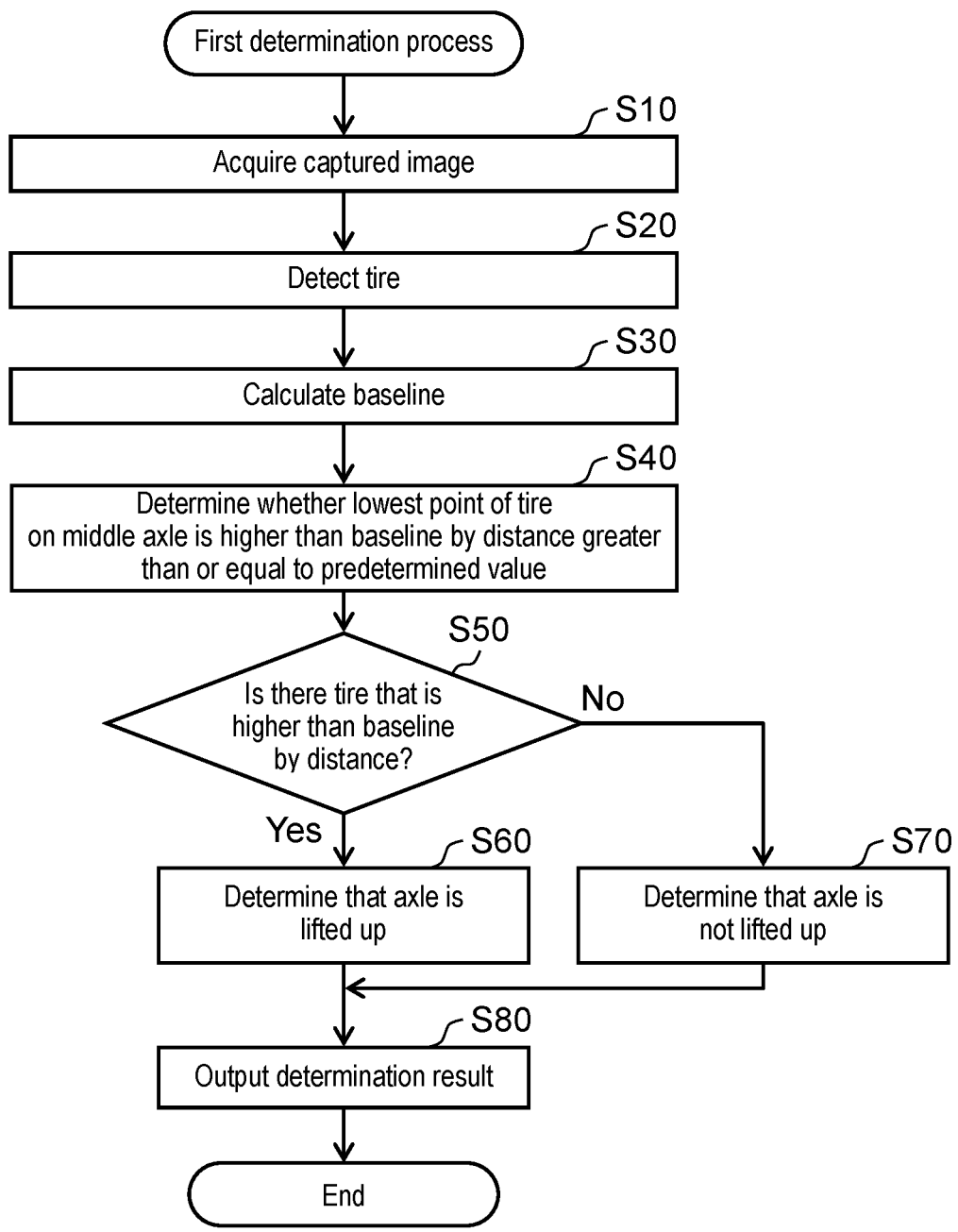
FIG. 7 is a flowchart of a first determination process.

FIG. 7 is a flowchart of the first determination process.

The first determination process is started upon output of one or more captured images including one or more tires of one vehicle 40 from image capturing device 20 to lift-up determining device 10.

When the first determination process is started, detector 11 acquires from image capturing device 20 one or more captured images including one or more tires of one vehicle 40 (step S10).

Then, detector 11 detects one or more tires from the acquired one or more captured images (step S20).

When detector 11 has detected one or more tires, calculator 12 calculates a baseline that extends from the lowest point of rear wheel tire 22 of vehicle 40 in a traveling direction of vehicle 40, from the one or more captured images acquired by detector 11 (step S30).

When calculator 12 has calculated the baseline, position determination unit 13 determines, regarding the middle tire on the middle axle of the one or more tires detected by detector 11, whether the lowest point of the middle tire is apart by greater than or equal to a predetermined value on the upper side of vehicle 40 from the baseline calculated by calculator 12 (step S40).

When the determination of position determination unit 13 is finished, determination unit 14 checks whether there is a tire that was positively determined by position determination unit 13 in the process of step S40 (step S50).

In the process of step S50, if there is a tire that was positively determined by position determination unit 13 (step S50: Yes), determination unit 14 determines that at least one axle of vehicle 40 is lifted up (step S60).

In the process of step S50, if there is no tire that was positively determined by position determination unit 13 (step S50: No), determination unit 14 determines that no axle of vehicle 40 is lifted up (step S70).

When the process of step S60 or step S70 is finished, determination unit 14 outputs a determination result to the outside (step S80).

When the process of step S80 is finished, lift-up determining device 10 finishes the first determination process.

[1-3. Advantageous Effects and the Like]

As described above, lift-up determining device 10 determines, from a captured image taken by external image capturing device 20, whether there is a tire on a middle axle lifted up to such an extent that the tire is not in contact with the ground. Then, lift-up determining device 10 determines whether at least one axle of the vehicle is lifted up, based on this determination result.

In this way, lift-up determining device 10 can determine in a non-contact manner whether an axle is lifted up.

Therefore, when lift-up determining device 10 is installed, it is not necessary to bury, in a traveling road or the like, a sensor and other components required to determine whether an axle is lifted up.

Therefore, by using this lift-up determining device 10, it is possible to make a cost required for installation, repair, or removal of the lift-up determining device lower than before.

Second Exemplary Embodiment

In this exemplary embodiment, as an aspect of the present disclosure, there will be described lift-up determining device 10a that is configured such that a part of the configuration of lift-up determining device 10 according to the first exemplary embodiment is modified.

Lift-up determining device 10 according to the first exemplary embodiment is an example of a configuration in which, by determining from a captured image whether there is a middle tire on a middle axle lifted up to such an extent that the tire is not in contact with the ground, it is determined whether an axle of a target vehicle is lifted up.

In contrast, lift-up determining device 10a according to the second exemplary embodiment is an example of a configuration in which, by determining from a captured image whether there is a tire that is not rotating to such an extent that the vehicle runs, it is determined whether an axle of a target vehicle is lifted up.

Hereinafter, lift-up determining device 10a will be described mainly on a difference from lift-up determining device 10 according to the first exemplary embodiment.

[2-1. Configuration]

Figure 8:
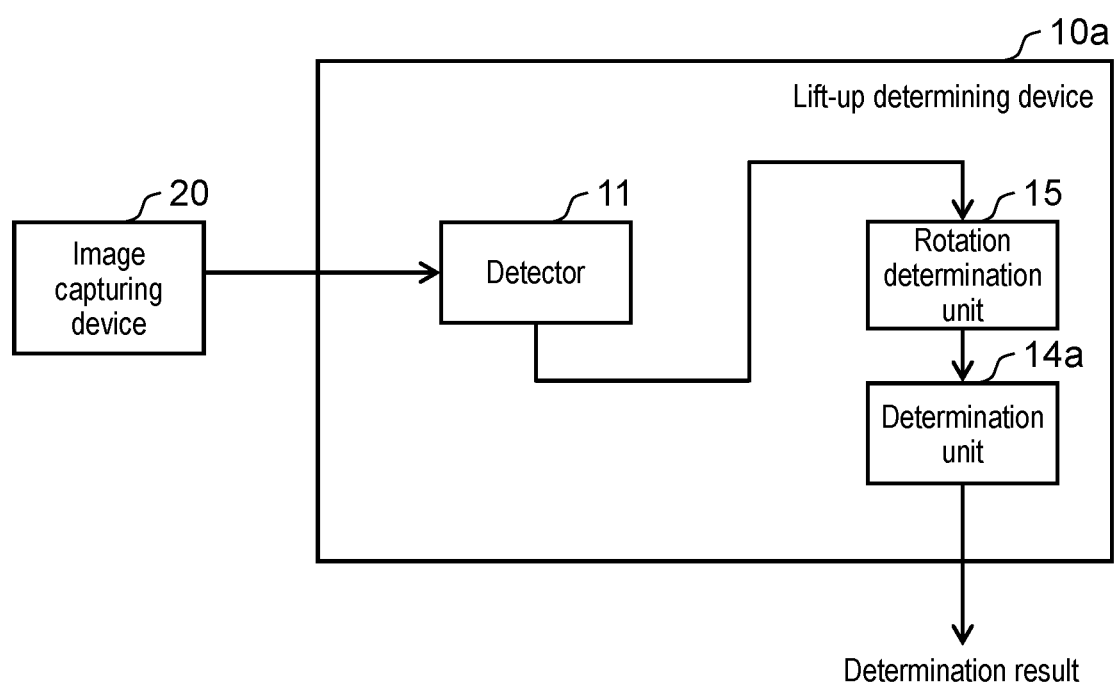
FIG. 8 is a block diagram showing a configuration of a lift-up determining device according to a second exemplary embodiment.

FIG. 8 is a block diagram showing a configuration of lift-up determining device 10a according to the second exemplary embodiment.

As shown in FIG. 8, lift-up determining device 10a is configured such that, with respect to lift-up determining device 10 according to the first exemplary embodiment, calculator 12 and position determination unit 13 are removed, determination unit 14 is changed to determination unit 14a, and rotation determination unit 15 is added.

Rotation determination unit 15 determines, based on one or more captured images acquired by detector 11, whether at least one tire of one or more tires detected by detector 11 is rotating.

More specifically, rotation determination unit 15 determines whether the tire is rotating, based on a frequency component of a plurality of pixels included in an area of the above at least one tire.

In general, if a tire is imaged while the tire is rotating, the image is susceptible to motion blur due to rotation compared with when the tire is not rotating. Therefore, there is a known phenomenon that, regarding a frequency component of pixel values of a plurality of pixels included in an area of the tire in a captured image having been taken, a proportion of a high frequency component is lowered.

Rotation determination unit 15 uses this phenomenon to determine whether the tire is rotating.

Specifically, for example, in a case where a first tire and a second tire are detected by detector 11, if a proportion of a high frequency component in a frequency component of pixel values of the pixels included in an area of the first tire is greater, by greater than or equal to a first predetermined value, than a proportion of a high frequency component in a frequency component of pixel values of pixels included in an area of the second tire, rotation determination unit 15 may determine that the second tire is not rotating.

Further, for example, regarding middle tire 23, 24 on the middle axle of vehicle 40, if a proportion of a high frequency component in a frequency component of pixel values of a plurality of pixels in an area of the tire is smaller, by greater than or equal to a second predetermined value, than a high frequency component in a frequency component of pixel values of a plurality of pixels included in an area of front wheel tire 21 or rear wheel tire 22 of vehicle 40, rotation determination unit 15 may determine that such middle tire 23, 24 is not rotating.

Specifically, rotation determination unit 15 may determine whether middle tire 23 detected by detector 11 is rotating, based on a result of a comparison of a frequency component of a plurality of pixels included in the area of middle tire 23 of vehicle 40 and a frequency component of a plurality of pixels included in the area of front wheel tire 21. Alternatively, rotation determination unit 15 may determine whether middle tire 23 detected by detector 11 is rotating, based on a result of a comparison of a frequency component of a plurality of pixels included in the area of middle tire 23 of vehicle 40 and a frequency component of a plurality of pixels included in the area of rear wheel tire 22. In this operation, rotation determination unit 15 may determine whether middle tire 23 is rotating, based on a result of a comparison of a proportion of a high frequency component of a frequency component of middle tire 23 and a proportion of a high frequency component of a frequency component of front wheel tire 21 or rear wheel tire 22.

Alternatively, for example, regarding middle tire 23, 24 on the middle axle of vehicle 40, if a proportion of a high frequency component in a frequency component of pixel values of a plurality of pixels in an area of middle tire 23, 24 is smaller than a third predetermined value, rotation determination unit 15 may determine that the tire is not rotating.

In this case, the first predetermined value, the second predetermined value, and the third predetermined value may be any value, as long as the values each make it possible to distinguish between a tire rotating to such an extent that the vehicle runs and a tire not rotating to such an extent that the vehicle runs. Further, the above predetermined values may change depending on an imaging condition (such as a shutter speed) when a captured image is taken by image capturing device 20.

Determination unit 14a determines, based on the detection result of detector 11, whether at least one axle of vehicle 40 is lifted up.

More specifically, determination unit 14a negatively performs the above determination, which is to be made by determination unit 14a, if there is a tire that is positively determined by rotation determination unit 15.

In general, regarding a vehicle equipped with a lift axle mechanism, a tire on a lifted-up axle does not rotate while the vehicle is running. Therefore, if a running vehicle has a non-rotating tire, it means that an axle of the vehicle to which the tire is attached is lifted up.

Further, determination unit 14a negatively performs the above determination, which is to be made by determination unit 14a, if there is no middle tire that is negatively determined by rotation determination unit 15.

Then, determination unit 14a outputs the determination result to the outside.

An operation performed by lift-up determining device 10a having the above configuration will be described below with reference to the drawing.

[2-2. Operation]

Lift-up determining device 10a performs, as a characteristic operation of lift-up determining device 10a, a second determination process configured by modifying a part of the first determination process according to the first exemplary embodiment.

Hereinafter, the second determination process will be described mainly on the difference from the first determination process according to the first exemplary embodiment.

Figure 9:
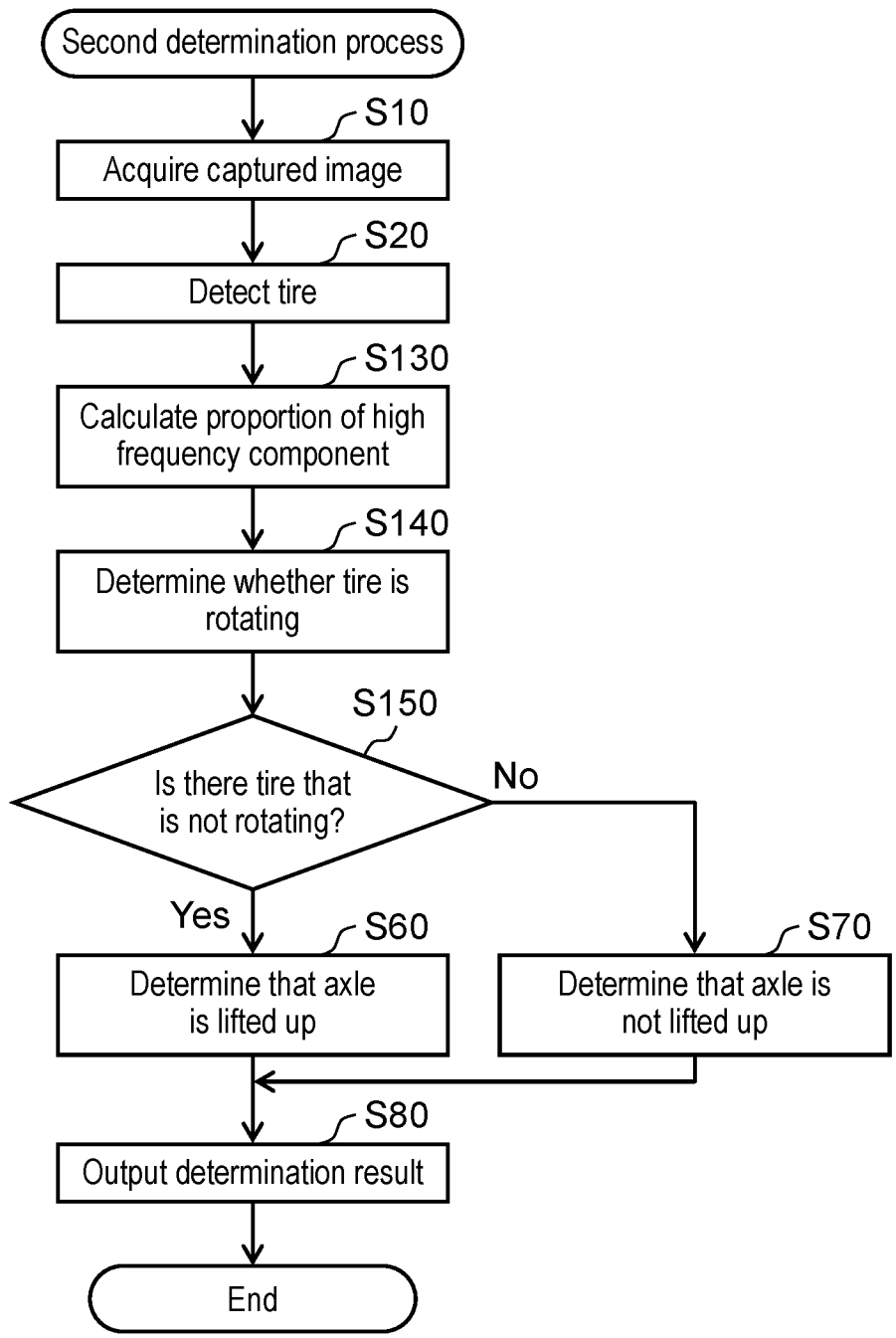
FIG. 9 is a flowchart of a second determination process.

FIG. 9 is a flowchart of the second determination process.

As shown in FIG. 9, the second determination process is configured such that, with respect to the first determination process according to the first exemplary embodiment, the process of step S30 is changed to a process of step S130, the process of step S40 is changed to a process of step S140, and the process of step S50 is changed to a process of step S150.

Therefore, in the following, a description will be mainly given on the process of step S130, the process of step S140, and the process of step S150.

In the second determination process, when a process of step S20 is finished, rotation determination unit 15 calculates, based on one or more captured images acquired by detector 11, a proportion of a high frequency component in a frequency component of pixel values of pixels included in an area of at least one tire of one or more tires detected by detector 11 (step S130).

Then, rotation determination unit 15 determines, based on the calculated proportion of the high frequency component, whether the tire is rotating (step S140).

When the determination by rotation determination unit 15 is finished, determination unit 14a checks, in the process of step S140, whether there is a tire that is negatively determined by rotation determination unit 15 (step S150).

If in the process of step S150 there is a tire that is negatively determined by rotation determination unit 15 (step S150: Yes), determination unit 14a performs a process of step S60.

If in the process of step S150 there is no tire that is negatively determined by rotation determination unit 15 (step S150: No), determination unit 14a performs a process of step S70.

[2-3. Advantageous Effects and the Like]

As described above, lift-up determining device 10a determines, from a captured image taken by external image capturing device 20, whether there is a tire that is not rotating to such an extent that the vehicle runs. Then, lift-up determining device 10a determines whether at least one axle of the vehicle is lifted up, based on this determination result.

In this way, lift-up determining device 10a can determine in a non-contact manner whether an axle is lifted up.

Therefore, when lift-up determining device 10a is installed, it is not necessary to bury, in a traveling road or the like, a sensor and other components required to determine whether an axle is lifted up.

Therefore, by using this lift-up determining device 10a, it is possible to make a cost required for installation, repair, or removal of the lift-up determining device lower than before.

Third Exemplary Embodiment

In this exemplary embodiment, as an aspect of the present disclosure, there will be described lift-up determining device 10b that is configured such that a part of the components of lift-up determining device 10a according to the second exemplary embodiment is modified.

Lift-up determining device 10a according to the second exemplary embodiment is an example of a configuration in which it is determined from a captured image whether a tire is rotating, based on a high frequency component in a frequency component of pixel values of a plurality of pixels in an area of the tire in the captured image.

In contrast, lift-up determining device 10b according to the third exemplary embodiment is an example of a configuration in which a rotation amount of one tire is calculated from two or more captured images and it is determined, from the calculated rotation amount, whether the tire is rotating.

Hereinafter, lift-up determining device 10b will be described mainly on a difference from lift-up determining device 10a according to the second exemplary embodiment.

[3-1. Configuration]

Figure 10:
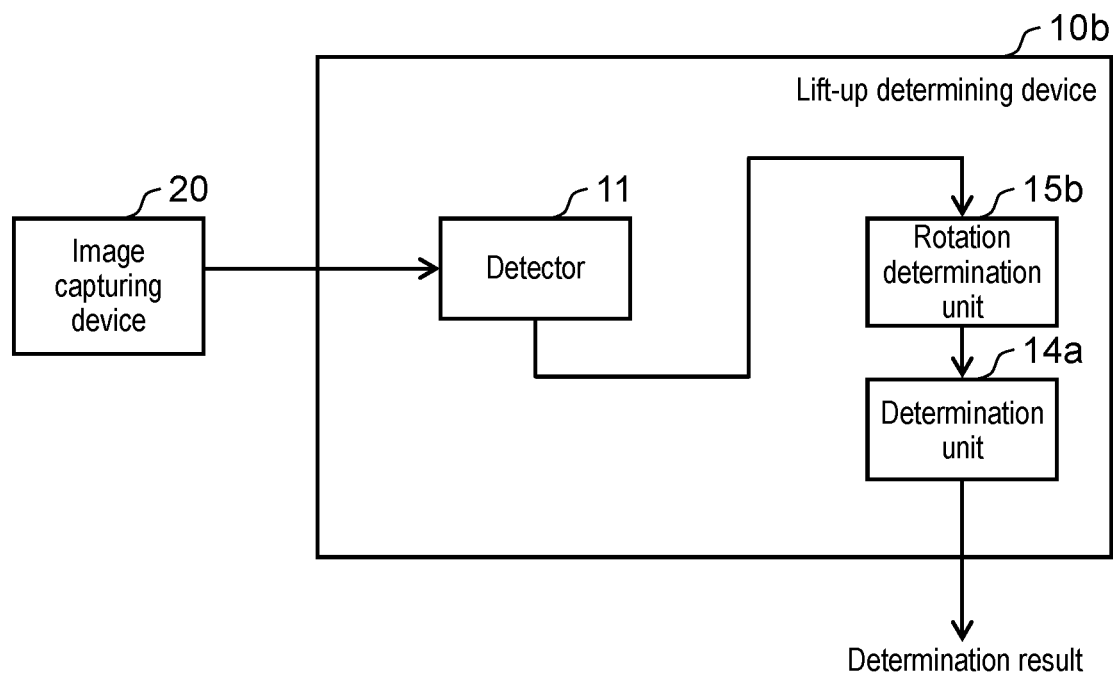
FIG. 10 is a block diagram showing a configuration of a lift-up determining device according to a third exemplary embodiment.

FIG. 10 is a block diagram showing a configuration of lift-up determining device 10b according to the third exemplary embodiment.

As shown in FIG. 10, lift-up determining device 10b is configured such that, with respect to lift-up determining device 10a according to the second exemplary embodiment, rotation determination unit 15 is changed to rotation determination unit 15b.

When detector 11 has detected one tire from two or more captured images, rotation determination unit 15b calculates a rotation amount of the tire from these two or more captured images and determines, based on the calculated rotation amount, whether the tire is rotating.

More specifically, for example, when one tire is detected from a first captured image and a second captured image (an example of another captured image), rotation determination unit 15b may calculate a rotation amount of the one tire by tracking movement of the one tire in the second captured image by performing a template matching on the second captured image by using pixel values of pixels included in an area of the one tire detected in the first captured image.

Figure 11:
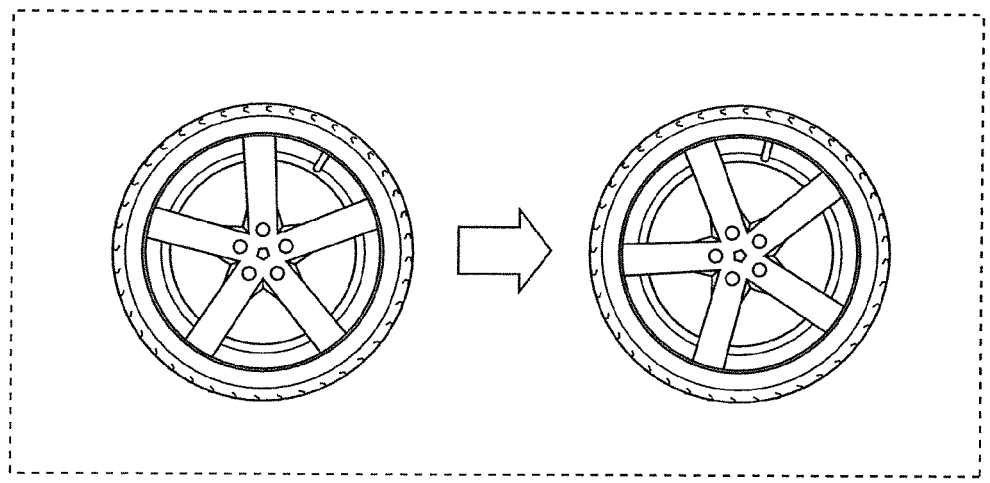
FIG. 11 is a schematic diagram showing when a tire is rotating.

FIG. 11 is a schematic diagram showing that one tire makes a rotation between the first captured image and the second captured image.

In a case where the tire detected by detector 11 has a shape, for example, shown in FIG. 11, rotation determination unit 15b may calculate the rotation amount of the tire by performing template matching by using, for example, an edge part, of a wheel, having a characteristic brightness, a pixel part corresponding to a rubber plug provided on the wheel of the detected tire, or other parts. Further, detector 11 may calculate the rotation amount of the tire by calculating an optical flow by using these parts.

Further, rotation determination unit 15b may estimate the rotation amount of the detected tire from, for example, a travel distance of the tire in the traveling direction of vehicle 40 and a radius of the tire, and may limit, based on the estimated rotation amount, an area in which the template matching is performed Further, for example, if the rotation amount calculated with respect to the one tire is less than or equal to a predetermined value, rotation determination unit 15b may determine that the tire is not rotating.

In this case, the above predetermined value may be any value, as long as the value makes it possible to distinguish between a tire rotating to such an extent that the vehicle runs and a tire not rotating to such an extent that the vehicle runs. Further, the above predetermined values may change depending on an imaging condition (such as an imaging cycle when two or more captured images are taken) when captured images are taken by image capturing device 20.

[3-2. Operation]

Lift-up determining device 10b performs, as a characteristic operation of lift-up determining device 10b, a third determination process configured by modifying a part of the second determination process according to the second exemplary embodiment.

Hereinafter, the third determination process will be described mainly on the difference from the second determination process according to the second exemplary embodiment.

Figure 12:
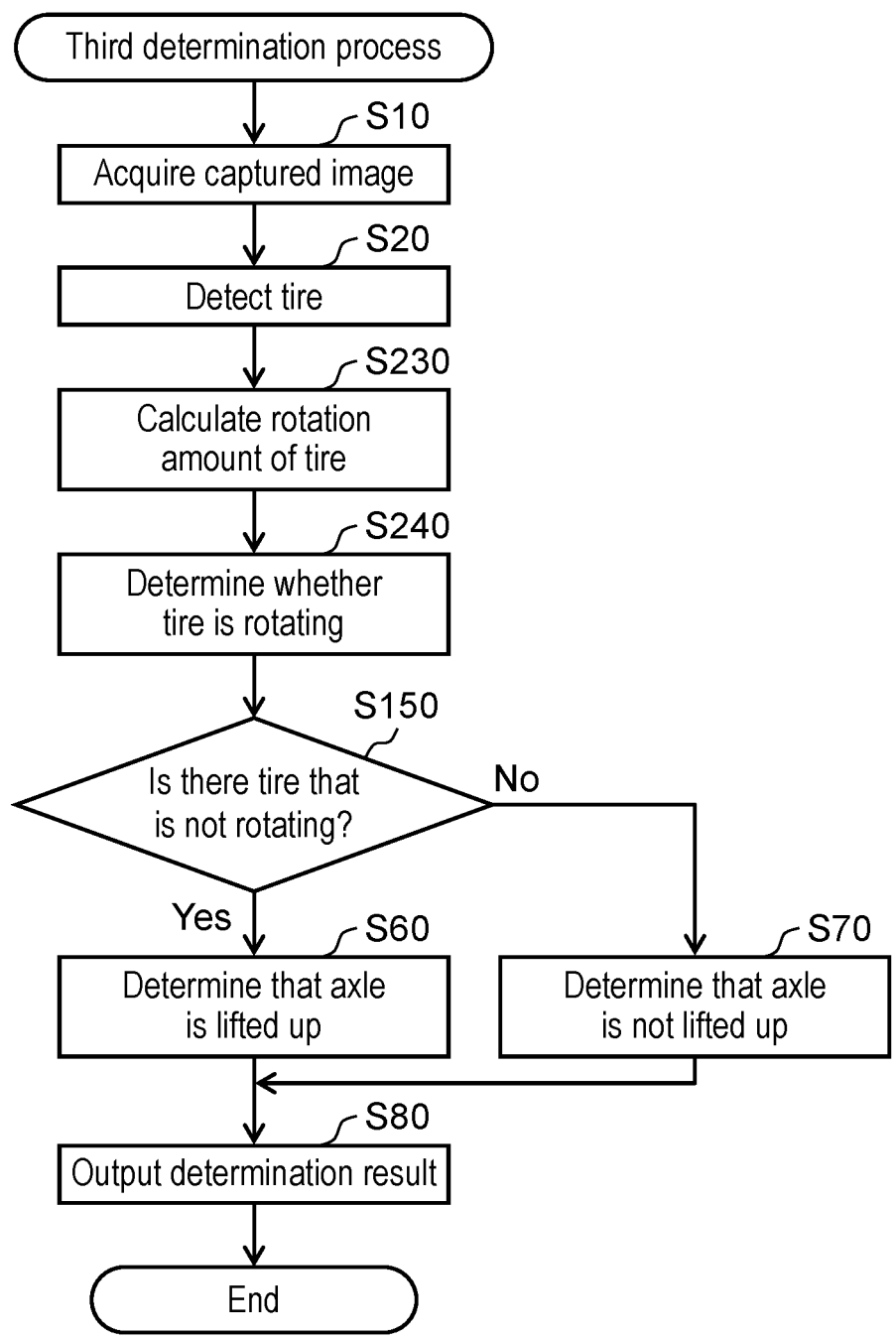
FIG. 12 is a flowchart of a third determination process.

FIG. 12 is a flowchart of the third determination process.

As shown in FIG. 12, the third determination process is configured such that, with respect to the second determination process according to the second exemplary embodiment, the process of step S130 is changed to a process of step S230, and the process of step S140 is changed to a process of step S240.

Therefore, in the following, a description will be mainly given on the process of step S230, and the process of step S240.

In the third determination process, when the process of step S20 is finished, rotation determination unit 15b calculates a rotation amount of one tire from two or more captured images acquired by detector 11 amount (step S230).

Then, rotation determination unit 15b determines, based on the calculated rotation amount, whether the tire is rotating (step S240).

When the process of step S240 is finished, determination unit 14a performs the process of step S150.

[3-3. Advantageous Effects and the Like]

As described above, lift-up determining device 10b determines, from captured images taken by external image capturing device 20, whether there is a tire that is not rotating to such an extent that the vehicle runs. Then, lift-up determining device 10b determines whether at least one axle of the vehicle is lifted up, based on this determination result.

In this way, lift-up determining device 10b can determine in a non-contact manner whether an axle is lifted up.

Therefore, when lift-up determining device 10b is installed, it is not necessary to bury, in a traveling road or the like, a sensor and other components required to determine whether an axle is lifted up.

Therefore, by using this lift-up determining device 10b, it is possible to make a cost required for installation, repair, or removal of the lift-up determining device lower than before.

Fourth Exemplary Embodiment

In this exemplary embodiment, as an aspect of the present disclosure, there will be described lift-up determining device 10c that is configured such that a part of the components of lift-up determining device 10 according to the first exemplary embodiment is modified.

Lift-up determining device 10 according to the first exemplary embodiment is an example of a configuration with which it is determined whether an axle of a target vehicle is lifted up, by determining from a captured image whether there is a tire on a middle axle lifted up to such an extent that the tire is not in contact with the ground.

In contrast, lift-up determining device 10c according to the fourth exemplary embodiment is an example of a configuration with which, by determining, from a captured image, whether there is a tire directly under which a local region of a road surface is not deflected, it is determined whether an axle of a target vehicle is lifted up.

Hereinafter, lift-up determining device 10c will be described mainly on a difference from lift-up determining device 10 according to the first exemplary embodiment.

[4-1. Configuration]

Figure 13:
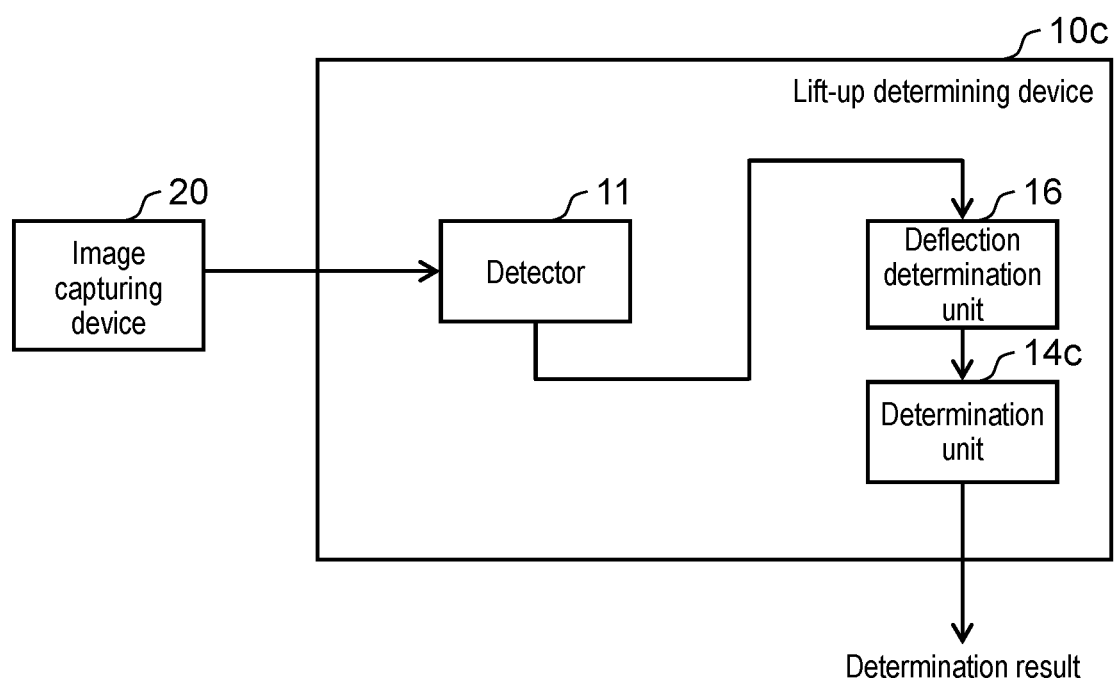
FIG. 13 is a block diagram showing a configuration of a lift-up determining device according to a fourth exemplary embodiment.

FIG. 13 is a block diagram showing a configuration of lift-up determining device 10c according to the fourth exemplary embodiment.

As shown in FIG. 13, lift-up determining device 10c is configured such that, with respect to lift-up determining device 10 according to the first exemplary embodiment, calculator 12 and position determination unit 13 are removed, determination unit 14 is changed to determination unit 14c, and deflection determination unit 16 is added.

Deflection determination unit 16 may determine, based on one or more captured images acquired by detector 11, whether a local region or local regions of a road surface located at the lowest point or lowest points of one or more tires detected by detector 11 are deflected by greater than or equal to a predetermined value.

In general, a phenomenon is known to occur, and in that phenomenon, when a tire is in contact with a road surface, a local region of the road surface with which the tire is in contact is deflected by an axle load applied via the tire, by a deflection amount corresponding to the axle load.

Deflection determination unit 16 determines whether the deflection amount due to this phenomenon is greater than or equal to a predetermined value.

More specifically, deflection determination unit 16 previously stores, for example, a captured image of traveling road 30 that is included in an imaging area of device 20 and is not deflected (for example, a captured image of traveling road 30 taken by image capturing device 20 when no vehicle is running, and hereinafter this captured image is also referred to as a "reference image"). Further, deflection determination unit 16 may calculate the deflection amount of the local region of the road surface located at the lowest point of the tire by comparing the captured image acquired by detector 11 with a previously stored reference image, and may determine whether the calculated deflection amount is greater than or equal to the predetermined value.

In this exemplary embodiment, the above predetermined value can be any value as long as the value makes it possible to distinguish between a state where the road receives an axle load because a tire is in contact with the ground and a state where the road surface does not receive an axle load because a tire is not in contact with the ground. The above predetermined value may be, for example, a predetermined pixel number of the captured image (for example, 0.1 pixels) or may be, for example, a predetermined distance converted to the real space (for example, 1 mm). Further, the above predetermined values may change depending on an imaging condition (such as atmospheric temperature, humidity, road surface temperature, or weather) when a captured image is taken by image capturing device 20. Further, the above setting value may change depending on a type of the target tire, a type of a vehicle attached with the target tire, and the like. Further, the above predetermined value may change depending on the position of the lowest point of the target tire.

Determination unit 14c determines, based on the detection result of detector 11, whether at least one axle of vehicle 40 is lifted up.

More specifically, determination unit 14c negatively performs the above determination, which is to be made by determination unit 14c, if there is a tire that is positively determined by deflection determination unit 16.

In general, regarding a vehicle equipped with a lift axle mechanism, a tire on a lifted-up axle is not in contact with a road surface while the vehicle is running. Therefore, if a running vehicle has a tire directly under which the local region of the road surface is not deflected, it means that an axle of the vehicle to which the tire is attached is lifted up.

Further, determination unit 14c negatively performs the above determination, which is to be made by determination unit 14c, if there is no middle tire that is negatively determined by deflection determination unit 16.

Then, determination unit 14c outputs the determination result to the outside.

An operation performed by lift-up determining device 10c having the above configuration will be described below with reference to the drawing.

[4-2. Operation]

Lift-up determining device 10c performs, as a characteristic operation of lift-up determining device 10c, a fourth determination process configured by modifying a part of the first determination process according to the first exemplary embodiment.

Hereinafter, the fourth determination process will be described mainly on the difference from the first determination process according to the first exemplary embodiment.

Figure 14:
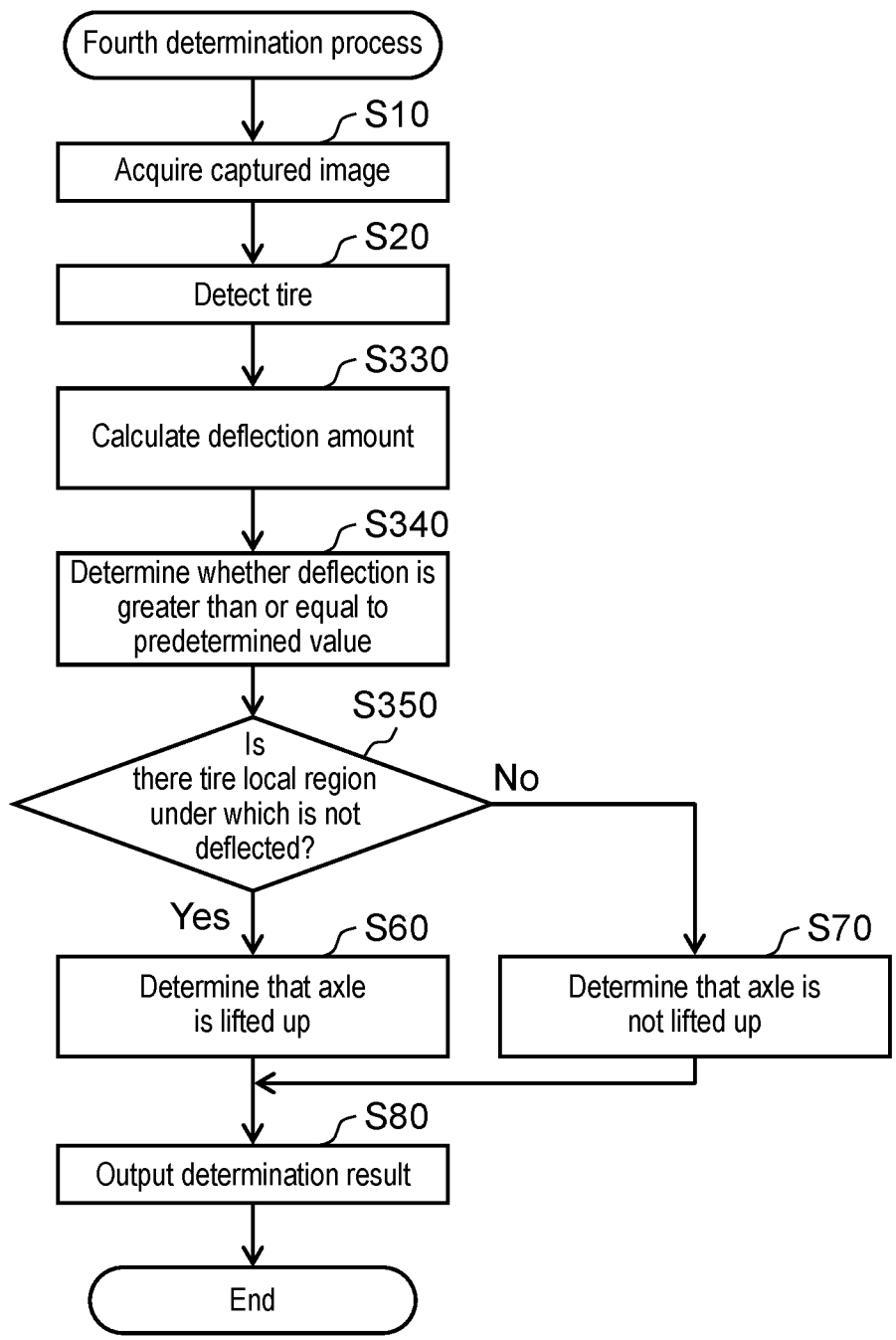
FIG. 14 is a flowchart of a fourth determination process.

FIG. 14 is a flowchart of the fourth determination process.

As shown in FIG. 14, the fourth determination process is configured such that, with respect to the first determination process according to the first exemplary embodiment, the process of step S30 is changed to a process of step S330, the process of step S40 is changed to a process of step S340, and the process of step S50 is changed to a process of step S350.

Therefore, in the following, a description will be mainly given on the process of step S330, the process of step S340, and the process of step S350.

In the fourth determination process, when a process of step S20 is finished, deflection determination unit 16 calculates, based on one or more captured images acquired by detector 11, a deflection amount or deflection amounts of a local region or local regions of a road surface located directly under a lowest point or lowest points of one or more tires detected by detector 11 (step S330).

Then, deflection determination unit 16 determines whether the calculated deflection amount or deflection amount are greater than or equal to a predetermined value (step S340).

When the determination by deflection determination unit 16 is finished, determination unit 14c checks, in the process of step S340, whether there is a tire that is negatively determined by deflection determination unit 16 (step S350).

If in the process of step S350 there is a tire that is negatively determined by deflection determination unit 16 (step S350: Yes), determination unit 14c performs a process of step S60.

If in the process of step S350 there is no tire that is negatively determined by deflection determination unit 16 (step S350: No), determination unit 14c performs a process of step S70.

[4-3. Advantageous Effects and the Like]

As described above, lift-up determining device 10c determines, from a captured image taken by external image capturing device 20, whether there is a tire located directly under which a local region of a road surface is not deflected by greater than or equal to a predetermined value. Then, lift-up determining device 10c determines whether at least one axle of the vehicle is lifted up, based on this determination result.

In this way, lift-up determining device 10c can determine in a non-contact manner whether an axle is lifted up.

Therefore, when lift-up determining device 10c is installed, it is not necessary to bury, in a traveling road or the like, a sensor and other components required to determine whether an axle is lifted up.

Therefore, by using this lift-up determining device 10c, it is possible to make a cost required for installation, repair, or removal of the lift-up determining device lower than before.

Other Exemplary Embodiments

As described above, the first to fourth exemplary embodiments have been described as illustrations of the technique disclosed in the present application. However, the technique in the present disclosure is not limited to the first to fourth exemplary embodiments, and are applicable to exemplary embodiments in which changes, replacements, additions, omissions, or the like are made as appropriate.

(1) Lift-up determining device 10, lift-up determining device 10a, lift-up determining device 10b, and lift-up determining device 10c illustrated in the first to fourth exemplary embodiments are examples each configured to include any one of position determination unit 13 according to first exemplary embodiment, rotation determination unit 15 according to second exemplary embodiment, rotation determination unit 15b according to the third exemplary embodiment, and deflection determination unit 16 according to the fourth exemplary embodiment.

In contrast, another example can be considered such that the example is configured to include two or more of position determination unit 13 according to the first exemplary embodiment, rotation determination unit 15 according to the second exemplary embodiment, rotation determination unit 15b according to the third exemplary embodiment, and deflection determination unit 16 according to the fourth exemplary embodiment. In this example, it may be determined whether at least one axle of vehicle 40 is lifted up, based on determination results by these two or more determination units.

Figure 15:
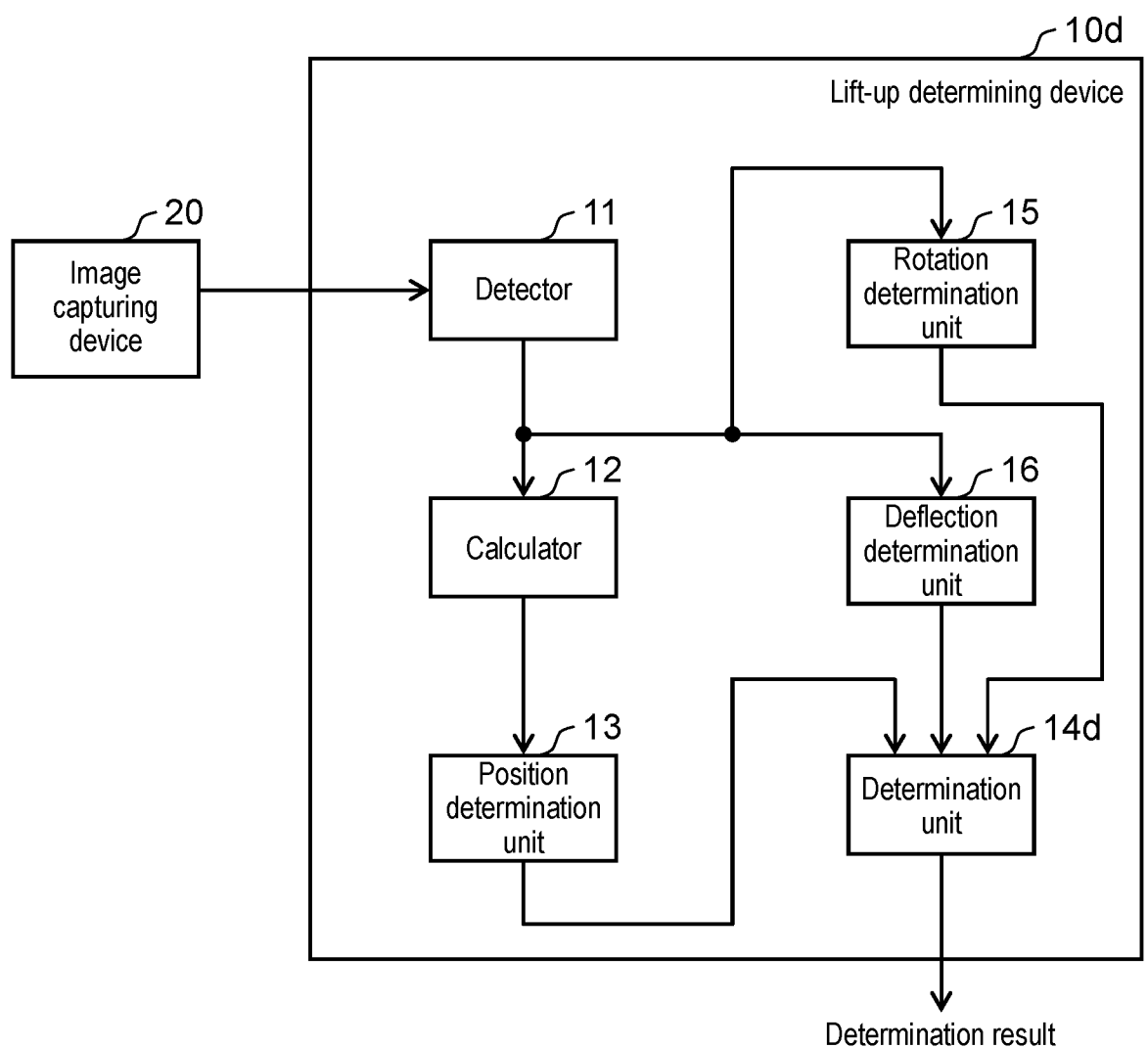
FIG. 15 is a block diagram showing a configuration of a lift-up determining device according to another exemplary embodiment.

FIG. 15 is a block diagram showing a configuration of lift-up determining device 10d according to another exemplary embodiment.

As shown in FIG. 15, lift-up determining device 10d is configured to include detector 11, calculator 12, and position determination unit 13 according to the first exemplary embodiment, rotation determination unit 15 according to the second exemplary embodiment, and deflection determination unit 16 and determination unit 14d according to the fourth exemplary embodiment.

Determination unit 14d determines whether at least one axle of vehicle 40 is lifted up, based on a determination result of position determination unit 13, a determination result by rotation determination unit 15, and a determination result by deflection determination unit 16.

More specifically, determination unit 14d takes, for example, a majority vote or a weighted majority vote among the determination result of position determination unit 13, the determination result of rotation determination unit 15, and the determination result of deflection determination unit 16. Then, determination unit 14d may determine, following the determination result accounting for the largest number, whether at least one axle of vehicle 40 is lifted up.

Alternatively, determination unit 14d may apply, for example, an evaluation function using likelihood to the determination result by position determination unit 13, the determination result by rotation determination unit 15, and the determination result by deflection determination unit 16, thereby calculating degrees of probabilities of these determination results. Then, determination unit 14d may determine, following the most probable determination result, whether at least one axle of vehicle 40 is lifted up.

(2) In the fourth exemplary embodiment, it is described that lift-up determining device 10c determines whether the axle of a target vehicle is lifted up, by determining, from a captured image, whether there is a tire directly under which a local region of a road surface is not deflected.

In contrast, lift-up determining device 10c may be configured such that lift-up determining device 10c determines whether the axle of the target vehicle is lifted up, by, for example, determining from a captured image whether there is a tire at the lowest point of which a local region is deflected.

This configuration example is implemented such that, for example, deflection determination unit 16 determines whether a local region or local regions of a road surface or road surfaces directly under the lowest point or the lowest points of one or more tires detected by detector 11 are deflected by greater than or equal to a predetermined value, based on one or more captured images acquired by detector 11.

In this configuration example, deflection determination unit 16 may be configured, for example, as follows. Instead of directly calculating the deflection amount of the local region at the lowest point of the target tire, deflection determination unit 16 calculated a tire profile of a target tire, and if the calculated tire profile is less than or equal to a predetermined value, deflection determination unit 16 determines that the local region at the lowest point of the tire is deflected by greater than or equal to a predetermined value.

(3) The components (function blocks) in lift-up determining device 10, lift-up determining device 10a, lift-up determining device 10b, lift-up determining device 10c, and lift-up determining device 10d may be individually integrated into one chips by using a semiconductor device such as an IC (Integrated Circuit) or an LSI (Large Scale Integration), or a part of or the whole of each component may be integrated into one chip. Further, the circuit integration is not necessarily implemented by an LSI, and may be implemented by a dedicated circuit or a general-purpose processor. It is also possible to use an FPGA (Field Programmable Gate Array), which can be programmed after being fabricated as an LSI, or to use a reconfigurable processor, in which connections or settings of circuit cells in the LSI can be reconfigured. Further, when there emerges a technique for circuit integration that replaces the LSI as a result of development of semiconductor technology or another technology derived from semiconductor technology, the function blocks may be integrated by using such techniques. There can be a possibility that biotechnology can be applied.

Further, all or a part of various processes described above may be implemented by hardware such as an electronic circuit, or may be implemented by using software. Note that processing by software is implemented in such a way that a processor included in the lift-up determining device executes a program stored in the memory. Further, the program may be recorded on a recording medium to be distributed or circulated. For example, the distributed program is installed in another device including a processor, and the program is executed by the processor, so that the device can execute the above processes.

Figure 16:
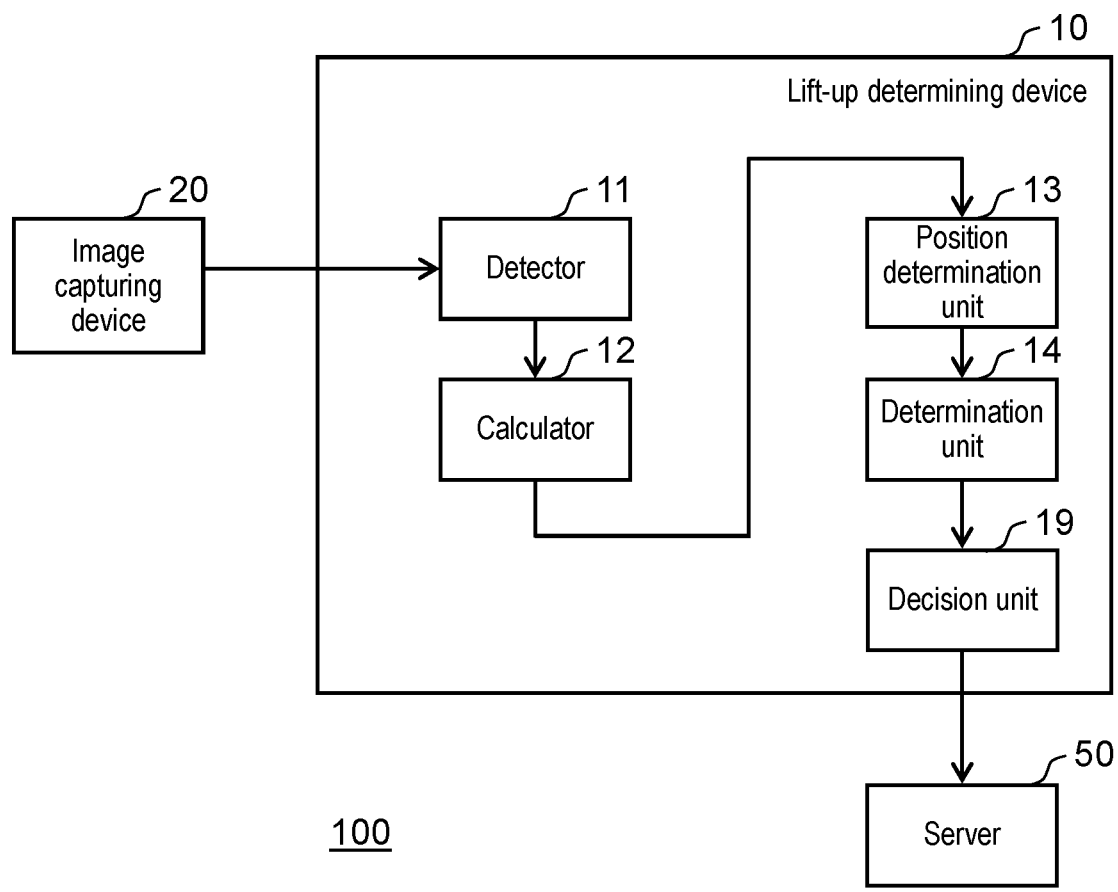
FIG. 16 is a block diagram showing a configuration of a toll setting system according to another exemplary embodiment.

(4) FIG. 16 shows toll setting system 100 according to the present disclosure. Toll setting system 100 includes lift-up determining device 10, image capturing device 20, and server 50. Lift-up determining device 10 includes decision unit 19. Note that decision unit 19 may be implemented by an electronic circuit in the same way as the other components of lift-up determining device 10 or may be implemented by a processor of lift-up determining device 10 executing a program. Server 50 includes a processor and a memory. A function of server 50 may be implemented by, for example, a processor executing a program stored in the memory.

Decision unit 19 determines a number of axle or axles that are on a vehicle included in a captured image and are not lifted up, based on a determination result by determination unit 14. For example, in a case where three axles are detected in a captured image and only one axle is lifted up, decision unit 19 determines the number of axles that are not lifted up to be two.

Server 50 sets a toll for the vehicle included in the captured image, based on the result determined by decision unit 19. For example, server 50 may set a toll of a vehicle higher as the number of axles that are not lifted up is larger.

The above configuration enables a toll for a vehicle to be set by using a captured image by image capturing device 20 without using a sensor buried in a traveling road. As a result, a toll for a vehicle can be set at a lower cost than before.

In addition, an embodiment realized by arbitrary combination of the components and the functions of the above-described exemplary embodiments is included in the scope of the present disclosure.

INDUSTRIAL APPLICABILITY

The present disclosure can be used for a lift-up determining device that determines whether one or more axles of a vehicle are lifted up.

REFERENCE MARKS IN THE DRAWINGS 10, 10a, 10b, 10c, 10d: lift-up determining device
11: detector
12: calculator 13: position determination unit
14, 14a, 14c, 14d: determination unit
15, 15b: rotation determination unit
16: deflection determination unit
19: decision unit
20: image capturing device
50: server
100: toll setting system

The invention claimed is:

1. A lift-up determining device comprising:
a detector that acquires a captured image including a tire of an axle of a vehicle and detects the tire from the captured image;
a determination unit that determines whether the axle is lifted up, based on a detection result of the detector; and
a position determination unit that determines, when the tire is a middle tire located between a front-most front wheel tire of the vehicle and a rear-most rear wheel tire of the vehicle, whether a lowest point of the middle tire is higher than a baseline by a distance greater than or equal to a predetermined value, the baseline extending in a traveling direction of the vehicle from a lowest point of the rear-most rear wheel tire,
wherein when the position determination unit determines that the lowest point of the middle tire is higher than the baseline by the distance greater than or equal to the predetermined value, the determination unit determines that the axle is lifted up.

2. The lift-up determining device according to claim 1, further comprising a calculator that calculates, from the captured image, a straight line connecting a lowest point of the front-most front wheel tire and the lowest point of the rear-most rear wheel tire,
wherein the position determination unit uses, as the baseline, the straight line calculated by the calculator.

3. The lift-up determining device according to claim 1, further comprising a rotation determination unit that determines, based on the captured image, whether the tire detected by the detector is rotating,
wherein when the rotation determination unit determines that the tire is not rotating, the determination unit determines that the axle is lifted up.

4. The lift-up determining device according to claim 3, wherein the rotation determination unit determines whether the tire is rotating, based on a frequency component of a plurality of pixels included in an area of the tire in the captured image.

5. The lift-up determining device according to claim 4, wherein the rotation determination unit determines whether the tire detected by the detector is rotating, based on a result of comparison between the frequency component and a frequency component of a plurality of pixels included in an area of a front-most front wheel tire of the vehicle in the captured image.

6. The lift-up determining device according to claim 4, wherein the rotation determination unit determines whether the tire detected by the detector is rotating, based on a result of comparison between the frequency component and a frequency component of a plurality of pixels included in an area of a rear-most rear wheel tire of the vehicle in the captured image.

7. The lift-up determining device according to claim 3, wherein
the detector acquires another captured image including the tire and detects the tire from the another captured image, and
the rotation determination unit calculates a rotation amount of the tire from the captured image and the another captured image, and determines whether the tire is rotating, based on the calculated rotation amount.

8. A lift-up determining device comprising:
a detector that acquires a captured image including a tire of an axle of a vehicle and detects the tire from the captured image;
a determination unit that determines whether the axle is lifted up, based on a detection result of the detector; and
a deflection determination unit that determines, based on the captured image, whether a local region of a road surface located directly under a lowest point of the tire detected by the detector is deflected by a distance greater than or equal to a predetermined value,
wherein when the deflection determination unit determines that the local region is not deflected by the distance greater than or equal to the predetermined value, the determination unit determines that the axle is lifted up.

9. A lift-up determining device comprising:
a detector that acquires a captured image including a tire of an axle of a vehicle and detects the tire from the captured image;
a determination unit that determines whether the axle is lifted up, based on a detection result of the detector;
a position determination unit that determines, when the tire is a middle tire located between a front-most front wheel tire of the vehicle and a rear-most rear wheel tire of the vehicle, whether a lowest point of the middle tire is higher than a baseline by a distance greater than or equal to a predetermined value, the baseline extending in a traveling direction of the vehicle from a lowest point of the rear-most rear wheel tire;
a rotation determination unit that determines, based on the captured image, whether the tire detected by the detector is rotating; and
a deflection determination unit that determines, based on the captured image, whether a local region of a road surface located directly under the lowest point of the middle tire detected by the detector is deflected by a distance greater than or equal to a predetermined value,
wherein the determination unit determines whether the axle is lifted up, based on a determination result of the position determination unit, a determination result of the rotation determination unit, and a determination result of the deflection determination unit.

10. The lift-up determining device according to claim 1, further comprising a decision unit that decides, based on a determination result of the determination unit, a number of axles of the vehicle that are not lifted up.

11. A lift-up determining method comprising:
acquiring a captured image including a tire of an axle of a vehicle;
detecting the tire from the captured image;
determining, based on a result of the detecting of the tire, whether the axle is lifted up; and
determining, when the tire is a middle tire located between a front-most front wheel tire of the vehicle and a rear-most rear wheel tire of the vehicle, whether a lowest point of the middle tire is higher than a baseline by a distance greater than or equal to a predetermined value, the baseline extending in a traveling direction of the vehicle from a lowest point of the rear-most rear wheel tire,
wherein when it is determined that the lowest point of the middle tire is higher than the baseline by the distance greater than or equal to the predetermined value, it is determined that the axle is lifted up.

12. A lift-up determining method comprising:

acquiring a captured image including a tire of an axle of a vehicle and detecting the tire from the captured image;

determining, based on a result of the detecting of the tire, whether the axle is lifted up; and determining, based on the captured image, whether a local region of a road surface located directly under a lowest point of the tire is deflected by a distance greater than or equal to a predetermined value, wherein when it is determined that the local region is not deflected by the distance greater than or equal to the predetermined value, it is determined that the axle is lifted up.

* * * * *